(12) United States Patent
Champion et al.

(10) Patent No.: US 9,908,816 B2
(45) Date of Patent: Mar. 6, 2018

(54) REFRACTORY POWDER COMPRISING COATED MULLITE GRAINS

(71) Applicant: SAINT-GOBAIN CENTRE DE RECHERCHES ET D'ETUDES EUROPEEN, Courbevoie (FR)

(72) Inventors: Thibault Champion, Maubec (FR); Christian His, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 177 days.

(21) Appl. No.: 14/797,901

(22) Filed: Jul. 13, 2015

(65) Prior Publication Data

US 2015/0315082 A1 Nov. 5, 2015

Related U.S. Application Data

(63) Continuation-in-part of application No. 13/643,173, filed as application No. PCT/IB2011/051823 on Apr. 27, 2011, now abandoned.

(30) Foreign Application Priority Data

Apr. 28, 2010 (FR) .................................... 10 53241

(51) Int. Cl.
  *C04B 35/107* (2006.01)
  *C04B 35/101* (2006.01)
  (Continued)

(52) U.S. Cl.
  CPC ........ *C04B 35/1015* (2013.01); *C04B 35/043* (2013.01); *C04B 35/101* (2013.01);
  (Continued)

(58) Field of Classification Search
  CPC ........................................... C04B 35/00–35/83
  See application file for complete search history.

(56) References Cited

U.S. PATENT DOCUMENTS 5,310,420 A 5/1994 Watts
6,261,720 B1 7/2001 Kimiya et al.
(Continued)

FOREIGN PATENT DOCUMENTS

CN 1089195 A 7/1994
CN 1800095 A 7/2006
(Continued)

OTHER PUBLICATIONS

Sainz, Maria A. et al. "Reactive Coating of Zircon on Mullite and Mullite-Alumina Substrates". J. Am Ceram. Soc., Jan. 1, 1997, vol. 80 (1), pp. 241-244, Spain.
(Continued)

*Primary Examiner* — Alexandre F Ferre
(74) *Attorney, Agent, or Firm* — Oliff PLC (57) ABSTRACT

A powder is disclosed having a coarse fraction representing more than 60% and less than 85% of the powder, as a weight percentage on the basis of the oxides, and that is constituted of particles having a size greater than or equal to 50 μm, referred to as "coarse particles", the powder comprising at least 5% of coated grains having a size greater than or equal to 50 μm, as a weight percentage on the basis of the oxides of the powder, and a fine fraction, forming the balance to 100% as a weight percentage on the basis of the oxides, constituted of particles having a size of less than 50 μm, referred to as "matrix particles". The powder can be applied in combustion chambers in which the temperature may reach 1400° C.

25 Claims, 3 Drawing Sheets

(51) Int. Cl.

| | |
|---|---|
| C04B 35/043 | (2006.01) |
| C04B 35/14 | (2006.01) |
| C04B 35/185 | (2006.01) |
| C04B 35/482 | (2006.01) |
| C04B 35/628 | (2006.01) |
| C04B 35/66 | (2006.01) |
| C04B 38/00 | (2006.01) |

(52) U.S. Cl.
CPC .......... *C04B 35/107* (2013.01); *C04B 35/14* (2013.01); *C04B 35/185* (2013.01); *C04B 35/482* (2013.01); *C04B 35/62807* (2013.01); *C04B 35/62813* (2013.01); *C04B 35/62815* (2013.01); *C04B 35/62818* (2013.01); *C04B 35/62821* (2013.01); *C04B 35/62823* (2013.01); *C04B 35/66* (2013.01); *C04B 38/0058* (2013.01); *C04B 2235/3206* (2013.01); *C04B 2235/3217* (2013.01); *C04B 2235/3244* (2013.01); *C04B 2235/3418* (2013.01); *C04B 2235/3463* (2013.01); *C04B 2235/5427* (2013.01); *C04B 2235/5436* (2013.01); *C04B 2235/5472* (2013.01); *C04B 2235/77* (2013.01); *C04B 2235/94* (2013.01); *C04B 2235/95* (2013.01); *C04B 2235/96* (2013.01); *C04B 2235/9669* (2013.01); *C04B 2235/9692* (2013.01)

(56) References Cited

U.S. PATENT DOCUMENTS

| | | | |
|---|---|---|---|
| 6,929,852 | B2 | 8/2005 | Lane et al. |
| 7,425,297 | B2 | 9/2008 | Saha et al. |
| 2005/0233084 | A1 | 10/2005 | Marty et al. |
| 2007/0254808 | A1 | 11/2007 | Yamada et al. |
| 2010/0081558 | A1 | 4/2010 | Taylor |

FOREIGN PATENT DOCUMENTS

| | | |
|---|---|---|
| EP | 1 462 430 A1 | 9/2004 |
| WO | 2007/053493 A1 | 5/2007 |

OTHER PUBLICATIONS

Park, Seong-Hwan et al. "Fabrication and Structure of TiO2 Coated Open-cell Ceramics". Key Engineering Materials, Jan. 1, 2006, vol. 317-318, pp. 139-142, Trans Tech Publications, Switzerland.

Ueno, Shunkichi et al. "Water vapor corrosion of mullite containing small amount of sodium". Ceramics International, Jan. 1, 2005, vol. 31, pp. 177-180, Elsevier, Amsterdam, NL.

Sainz, Maria A. et al. "Novel Technique for Zirconia-Coated Mullite". J. Am Ceram. Soc., Jan. 1, 1993, vol. 76, No. 7, pp. 1869-1872, Madrid, Spain.

Schmucker, Martin et al. "The high-temperature mullite/alumina conversion in rapidly flowing water vapor". Scripta Materialia, Dec. 1, 2006, vol. 55, No. 12, pp. 1131-1134, Elsevier, Amsterdam, NL.

Fritsch, Marco et al. "Water-Vapor Hot Gas Corrosion of Ceramic Materials in a Combustion Atmosphere". Fraunhofer Institut Keramische Technologien und Systeme, Jan. 1, 2006, p. 27, Dresden, Germany.

Dec. 1, 2010 Search Report issued in French Patent Application No. FR 1053241.

Dec. 1, 2010 Written Opinion issued in French Patent Application No. FR 1053241.

Oct. 5, 2011 International Search Report issued in Patent Application No. PCT/IB2011/051823.

Oct. 5, 2011 Written Opinion issued in International Patent Application No. PCT/IB2011/051823.

Office Action issued in Chinese Patent Application No. 201180032045.1 dated Aug. 5, 2013.

Fig. 3 ical field

REFRACTORY POWDER COMPRISING COATED MULLITE GRAINS

This application is a continuation-in-part of U.S. patent application Ser. No. 13/643,173 filed Oct. 24, 2012, which is the U.S. National Phase of International Application No. PCT/IB2011/051823 filed Apr. 27, 2011. The entire disclosures of these applications are incorporated herein by reference.

TECHNICAL FIELD

The invention relates to coated grains comprising more than 30% of mullite and to refractory products obtained from a powder comprising such coated grains.

The invention also relates to a process for the manufacture of a sintered refractory product from coated grains according to the invention. Such a refractory product can be used in particular in an environment in which it is subjected to the action of water vapor at a temperature of greater than 1000° C., in particular in combustion chambers in which the temperature can reach 1400° C.

STATE OF THE ART

In particular in these applications, the materials employed have to exhibit:
 a good resistance to high-temperature water vapor,
 a good resistance to mechanical stresses,
 a good creep strength,
 a good resistance to thermal shocks, and
 a good resistance to temperature variations.

It is known that the exposure of mullite blocks to high-temperature water vapor can result in the formation of a porous alumina layer at the surface exposed to this vapor.

The paper "*Water-vapor hot gas corrosion of ceramic materials in a combustion atmosphere*", Fritsch et al., Fraunhofer IKTS 2006 Annual Report, mentions examples of suitable materials.

However, there exists a need for new materials suitable for the very specific environment of combustion chambers, in particular gas turbine combustion chambers.

The aim of the invention is to satisfy this need.

SUMMARY OF THE INVENTION

The invention provides a coated grain comprising:
 a base grain comprising more than 30% by weight of mullite;
 a coating which covers, at least partially, said base grain and which is composed, for more than 90% of its weight, preferably for more than 95% of its weight, of a coating material chosen from:
  alumina;
  lanthanide, Ta, Ti, Sc, Y, Mg, Mo aluminates and their mixtures;
  lanthanide, Sc, Y, Zr, Hf silicates and their mixtures;
  oxides of one or more elements chosen from Ti, Sc, Y, Yb, Mg, Ce, Mo, Zr and Hf;
  lanthanide and/or Y and/or Sc phosphates;
  and their mixtures.

Mullite is conventionally regarded as sensitive to corrosion with high-temperature water vapor, as is described, for example, in "*The high-temperature mullite/α-alumina conversion in rapidly flowing water vapor*", Schmucker et al., Scripta Materiala, 55 (2006), 1131-1134.

In addition, generally, the adhesion of a coating to a base grain is a major problem when the coated grain is liable to be subjected to the abovementioned severe stresses and in particular to be subjected to the action of high-temperature water vapor. The thermal and mechanical shocks also tend to crack, indeed even to detach, the coating. Finally, the impurities of the base grain can substantially modify the quality of the adhesion.

In addition, the application of a coating to a base grain results in a coated grain which no longer exhibits the properties of this base grain, nor those of the coating material. In particular, the application of a coating can result in a substantial deterioration in the properties of the base grain, in particular as a result of chemical reactions between the material of the base grain and its impurities, on the one hand, and the material of the coating and its impurities, on the other hand.

Finally, the coated grains according to the invention are intended in particular to form at least a portion of the coarse fraction of a sintered refractory product in which they are bonded by means of a matrix. The selection of the materials, in particular of the coating material, thus involved looking for a chemical compatibility with the compounds envisaged to form said matrix.

The inventors have thus looked for "base grain material-coating material" pairs capable of meeting the objective set. This search has in particular led to the discarding, as coating material, of materials exhibiting a melting point of less than 1400° C. and the majority of non-oxide ceramic materials.

As will be seen in more detail in the continuation of the description, the inventors have finally discovered that the combination of a base grain comprising more than 30% of mullite and selected coating materials makes it possible to manufacture a refractory product perfectly suitable for applications in combustion chambers.

Without being committed to this theory, the inventors explain the performance achieved in particular by the ability of the selected coating materials to react with one or more of the constituents of the base grain, in particular with the alumina and/or the silica, in particular free silica, to form, at the interface between the base grain and the coating, a transition layer comprising both elements of the coating material and elements of the material of the base grain. The transition layer would consequently exhibit properties intermediate between those of the materials of the base grain and of the coating, facilitating the adhesion of the coating, even under extreme conditions of humidity and temperature.

A coated grain according to the invention can also comprise one or more of the following optional characteristics:
 The base grain comprises more than 40%, preferably more than 50%, preferably more than 60%, indeed even more than 70%, indeed even more than 80% of mullite, as percentage by weight based on the oxides. Preferably, the base grain is a mullite/zirconia or mullite grain. More preferably, the base grain is a mullite grain, preferably a grain of electrocast mullite.
 The base grain is made of a polycrystalline material.
 The base grain is a cast grain, that is to say obtained by a process comprising a stage of melting and a stage of hardening by cooling the molten material. Although this is not the preferred embodiment, the base grain can also be a sintered grain.
 The base grain is composed of oxides for more than 90%, more than 95%, more than 98%, even substantially 100% of its weight.
 The base grain exhibits a size of greater than 50 μm and less than 10 mm, preferably less than 5 mm.

The coating is solid.
The coating is preferably composed of:
    an external layer made of said coating material, and
    a transition layer which extends between the base grain and said external layer, preferably over a thickness of less than 10% of the thickness of the coating, and which exhibits a different composition from the materials of the base grain and coating.
The transition layer comprises:
    silica and/or alumina and/or impurities initially present in the base grains, and
    one of the constituents of the coating material, the silica, the alumina and the impurities initially present in the transition layer preferably representing at least 1% of the weight of the coating.
The transition layer comprises silica and at least one of the constituents of the coating material.
The transition layer comprises silica and all the constituents of the coating material.
The transition layer comprises silica in the form of a silicate.
The coating material is chosen from:
    $Al_2O_3$;
    $GdAlO_3$, $Gd_4Al_2O_9$, $Gd_3Al_5O_{12}$, $AlTaO_4$, $Al_2TiO_5$, $Y_3Al_5O_{12}$, $YAlO_3$ (YAP), $Y_4Al_2O_9$, $Yb_4Al_2O_9$, $YbAlO_3$, $Yb_3Al_5O_{12}$, $MgAl_2O_4$ and their mixtures;
    $Gd_2SiO_5$, $Gd_2Si_2O_7$, $Sc_2Si_2O_7$, $Sc_2SiO_5$, $Y_2Si_2O_7$, $Y_2SiO_5$, $Yb_2Si_2O_7$, $Yb_2SiO_5$, $ZrSiO_4$, $HfSiO_4$, $(Zr,Hf)SiO_4$, $CaSiO_3$;
    $ZrO_2$, $HfO_2$, $HfTiO_4$, $ScTaO_4$, $Sc_4Hf_3O_{12}$, $Sc_4Zr_3O_{12}$, a partially stabilized and/or stabilized zirconia, a partially stabilized and/or stabilized hafnone, and their mixtures;
    $LaPO_4$, $YPO_4$ and their mixtures;
    and their mixtures.
Preferably again, the coating material is chosen from:
    $Al_2O_3$; and/or
    $Gd_4Al_2O_9$, $AlTaO_4$, $Al_2TiO_5$, $Y_4Al_2O_9$, $Yb_4Al_2O_9$, $MgAl_2O_4$, $Y_2SiO_5$, $Yb_2SiO_5$, $Gd_2SiO_5$ and their mixtures; and/or
    $ZrO_2$, $HfO_2$, $HfTiO_4$, $ScTaO_4$, $Sc_4Hf_3O_{12}$, $Sc_4Zr_3O_{12}$, a zirconia partially stabilized and/or stabilized with yttrium oxide, a hafnone partially stabilized and/or stabilized with yttrium oxide, and their mixtures;
    and their mixtures.
Preferably, finally, the coating material is alumina. Preferably, said transition layer then comprises alumina silicate.
Preferably, the external layer made of said coating material exhibits a content of impurities (constituents other than said coating material) of less than 5%, of less than 2%, of less than 1%, as percentage by weight, indeed even substantially zero.
Preferably, the coating material exhibits a thermal expansion coefficient greater than that of the material of the base grain and/or greater than that of mullite.
The thickness of the coating is greater than 8 μm, preferably greater than 10 μm, preferably greater than 15 μm, preferably greater than 20 μm and/or less than 300 μm, indeed even less than 250 μm, indeed even less than 200 μm.
The weight of the coating represents more than 0.01%, more than 0.1% and/or less than 100%, less than 50%, less than 40%, less than 30%, indeed even less than 10%, less than 5%, less than 3%, less than 1%, of the weight of the base grain.

The coating extends over more than 50%, preferably more than 60%, preferably more than 70%, preferably more than 80%, preferably more than 90%, preferably more than 95%, preferably more than 99% of the surface of the base grain. Preferably, the coating covers substantially all the surface of said base grain.
The coated grain has been subjected to a heat treatment at a temperature of greater than 1200° C., preferably greater than 1500° C., indeed even greater than 1600° C., for a period of time preferably of greater than 3 hours, preferably greater than 5 hours.
The surface porosity of the coating, which can be measured at the surface of the coating as described below, is less than 25%, preferably less than 20%, preferably less than 15%, preferably less than 10%, preferably less than 5%, preferably less than 3%, indeed even less than 2%.
The coated grains according to the invention are intended in particular to be used in the coarse fraction of a sintered refractory material.
The invention thus also relates to a powder comprising coated grains according to the invention, in particular a powder comprising:
    a coarse fraction representing less than 85% of the powder, as percentage by weight based on the oxides, and consisting of particles exhibiting a size of greater than or equal to 50 μm, referred to as "coarse particles", the powder comprising at least 5% of coated grains according to the invention exhibiting a size of greater than or equal to 50 μm, as percentage by weight based on the oxides of the powder, and
    a fine fraction, forming the remainder to 100% as percentage by weight based on the oxides, consisting of particles exhibiting a size of less than 50 μm, referred to as "matrix particles".
A powder according to the invention can comprise more than 20% of particles exhibiting a size greater than 150 μm, preferably greater than 200 μm, as percentage by weight based on the oxides of the powder.
A powder according to the invention can also exhibit one or more of the following optional characteristics:
    More than 90%, more than 95%, indeed even substantially 100%, as percentage by weight, of the particles of the powder exhibit a size of less than 10 mm, of less than 8 mm, indeed even of less than 5 mm.
    The coarse fraction represents less than 80%, less than 75%, and/or more than 60%, more than 65%, indeed even more than 70% of the weight of the oxides of the powder.
    The powder contains more than 10%, preferably more than 20%, preferably more than 25%, indeed even more than 30%, indeed even more than 40%, of coated grains according to the invention exhibiting a size of greater than or equal to 50 μm, as a percentage by weight based on the oxides of the powder.
    The coated grains of the coarse fraction are preferably mullite/zirconia and/or mullite grains. Preferably, the coated grains are grains of electrocast mullite. More preferably, the coating of said coated grains is made of alumina.
    Said coated grains exhibit a size of less than 10 mm, preferably of less than 8 mm, indeed even of less than 5 mm.
    The uncoated grains of the coarse fraction, which exhibit a composition identical to that of the base grains of the coated grains (according to the invention) of the coarse fraction, represent less than 50%, less than 40%, less than 30%, less than 20%, less than 10%, less than 5%, of the weight of the coarse fraction.

The coarse fraction comprises particles composed, for more than 95% of their weight, of alumina and/or zirconia and/or magnesia and/or silica. These constituents can thus be present within one and the same particle, for example in the form of a eutectic. In one embodiment, the coarse fraction comprises, for more than 95% of its weight, these particles (or mixtures of these particles) and coated grains according to the invention, and in particular coated grains having base grains made of mullite/zirconia and/or mullite, which is in particular electrocast.

The fine fraction comprises less than 5%, less than 2%, preferably less than 1%, of coated grains according to the invention, indeed even does not comprise such coated grains, as percentage by weight based on the oxides of the powder.

The fine fraction comprises, indeed even consists of, particles composed of alumina and/or zirconia and/or magnesia and/or silica, preferably composed of alumina and/or silica.

The fine fraction comprises less than 90% of silica, as percentage by weight based on the oxides of the fine fraction.

The powder is composed, for more than 95%, more than 99%, indeed even substantially 100%, of refractory oxides, as percentage by weight based on the weight of the powder.

The powder exhibits a content of alumina $Al_2O_3$ of greater than 60%, preferably of greater than 70%, preferably of greater than 80%, preferably of greater than 85%, as percentage by weight based on the oxides.

The powder exhibits a content of silica $SiO_2$ of less than 30%, preferably of less than 20%, preferably of less than 15%, preferably of less than 12%, preferably of less than 10%, as percentage by weight based on the oxides.

The powder is dry, in particular to the touch. Preferably, it exhibits a moisture content of less than 3%, preferably of less than 2%, more preferably of less than 1%.

The invention also relates to a process for the manufacture of a sintered refractory product, comprising the following successive stages:

A) preparation of a starting charge by addition of water to a powder according to the invention,
B) shaping said starting charge so as to form a preform;
C) sintering said preform.

The sintering can be carried out in particular in situ, that is to say after the product has been positioned in its operating position.

The invention also relates to a refractory product comprising coated grains according to the invention, this product being in particular in the form of a preform intended to be sintered and in the form of a sintered product.

A coated grain according to the invention can thus be a particle of a powder according to the invention or can be incorporated within a preform or a sintered refractory product.

In a first preferred embodiment, the coated grains according to the invention are distributed throughout the body of the preform or of the sintered refractory product according to the invention, and are not only close to their surface. Preferably, the coated grains according to the invention are distributed throughout the whole body of the preform or of the sintered product according to the invention in a substantially homogeneous way.

In a second embodiment, more than 90% by number of the coated grains according to the invention of the sintered refractory product or of the preform according to the invention are distributed, preferably substantially homogeneously, within a surface layer exhibiting a thickness of greater than 3 mm, indeed even of greater than 5 mm, and preferably of less than 15 mm, indeed even of less than 10 mm.

Preferably, in the sintered refractory product, the coated grains exhibit an open porosity which is lower than that of the matrix which binds them.

This refractory product can in particular exhibit the appearance of a block, in particular of a tile, or the appearance of a layer, for example in the form of a lining applied, by any known process, to a wall to be protected. Such a block or layer can have a thickness of greater than 3 mm, indeed even of greater than 5 mm. The block or layer can have a thickness preferably of less than 15 mm, indeed even of less than 10 mm.

The smallest dimension of the block can be greater than 5 mm, greater than 10 mm, greater than 20 mm.

The greatest dimension of the block can be greater than 50 mm, greater than 100 mm, greater than 150 mm, greater than 200 mm.

Preferably, the open porosity of the refractory product is less than 30%, preferably less than 25%, preferably less than 20%, indeed even less than 18%.

This refractory product can be manufactured according to a process according to the invention. This process advantageously makes it possible to manufacture a sintered refractory product according to the invention exhibiting a bulk density of between 2.5 and 4 $g/cm^3$, preferably of between 2.8 and 3.5 $g/cm^3$.

The invention relates in addition to a device chosen from a combustion chamber, in particular a combustion chamber of a turbine, and a reformer, in particular a Claus reformer, said device comprising a refractory product according to the invention, in particular in the form of a protective part.

More generally, the invention relates to the use of a refractory product according to the invention in an application where said refractory product is subjected to gases and in particular to gases laden with water vapor, said gases exhibiting a temperature of greater than 1000° C., of greater than 1200° C., of greater than 1400° C., indeed even of greater than 1500° C. The invention relates in particular to the use of a refractory product according to the invention in a gas reforming application, in particular in a Claus reformer.

DEFINITIONS

The term "ceramic material" is used to describe any nonmetallic or nonorganic material.

Conventionally, a "mixture" of constituents can take the form of a defined compound, for example $HfTiO_4$, of a solid solution, for example of $Cr_2O_3$ and $Al_2O_3$, or of a dispersion of one oxide in another.

The term "partially stabilized and/or stabilized zirconia" is used to describe a zirconia partially stabilized or stabilized using a stabilizing agent and exhibiting less than 50% of its weight in the monoclinic crystallographic phase. The other opposing crystallographic phases are the cubic phase and the tetragonal phase. The amount of stabilized and/or partially stabilized zirconia is measured by X-ray diffraction.

The term "partially stabilized and/or stabilized hafnone" is used to describe a hafnone partially stabilized or stabilized using a stabilizing agent and exhibiting less than 50% of its weight in the monoclinic crystallographic phase. The other opposing crystallographic phases are the cubic phase and the tetragonal phase. The amount of stabilized and/or partially stabilized hafnone is measured by X-ray diffraction.

The term "size of a particle" is understood to mean the dimension of a particle conventionally given by a particle size distribution characterization carried out with a laser particle sizer. The laser particle sizer used for the examples is a Partica LA-950 from Horiba.

The term "median size" of an assembly of particles, in particular within a material for impregnating a powder, is used to describe the $D_{50}$ percentile, that is to say the size dividing the particles into a first population and a second population equal in weight, these first and second populations comprising only particles exhibiting a size respectively greater or less than the median size.

The term "temporary" is understood to mean "removed from the product during the sintering".

Unless otherwise indicated, all the percentages are percentages by weight.

The various characteristics of a product according to the invention can be determined by the characterization methods used for the examples below.

DETAILED DESCRIPTION

The manufacture of coated grains according to the invention can be carried out according to any technique known to a person skilled in the art. Preferably, it results from a process comprising the following stages:

a) preparation of a slip comprising particles of coating material in suspension;
b) dipping base grains in said slip and then extraction of the grains thus wetted;
c) optionally, drying the wetted grains;
d) optionally, heat treatment.

In stage a), the term "slip" denotes a suspension of particles made of coating material or of precursors of said coating materials in a liquid, generally water, with or without additives, such as dispersing agents, deflocculating agents, polymers, and the like.

Preferably, the slip comprises a temporary binding agent, that is to say a binding agent which is removed during the drying and/or sintering. The slip can be manufactured in a container, according to techniques known to a person skilled in the art, by mixing and homogenizing the particles and the desired amount of liquid. The particles can exhibit a median size of between 0.1 and 50 µm. The slip typically comprises more than 60% of dry matter.

According to the invention, the coating material is chosen from:
  alumina;
  lanthanide, Ta, Ti, Sc, Y, Mg or Mo aluminates and their mixtures;
  lanthanide, Sc, Y, Zr or Hf silicates and their mixtures;
  oxides of one or more elements chosen from Ti, Sc, Y, Yb, Mg, Ce, Mo, Zr and Hf;
  lanthanide and/or Y and/or Sc phosphates;
  and their mixtures.

The mixtures of the various materials mentioned above within a coating material can be in the form of a defined compound, of a solid solution or of a more or less intimate mixture of the materials (for example dispersoid).

The coating material preferably exhibits a thermal expansion coefficient of between $4 \cdot 10^{-6 \circ}$ C.$^{-1}$ and $10 \cdot 10^{-6 \circ}$ C.$^{-1}$, preferably of less than or equal to $9 \cdot 10^{-6 \circ}$ C.$^{-1}$. More preferably, the coating material is chosen so that its thermal expansion coefficient, at ambient temperature, is greater than that of the material of the base grain. At high temperature, the coating layer is thus compressed, which limits the risks of cracks, indeed even of detachment of the coating.

The coating material preferably exhibits a melting point which is greater than or equal to the temperature of use of the sintered refractory product in which the coated grains are intended to be incorporated and/or greater than the sintering temperature used to manufacture said refractory product.

In stage b), the base grains are temporarily immersed in the slip. Optionally, mixing can improve the wetting of the base grains by the slip. The wetted grains are coated grains according to the invention.

In stage c), after having been dipped in the slip, the wetted grains can optionally be dried. The coating is then advantageously solid.

Any conventional drying process can be used.

In stage d), the wetted and optionally dried grains can optionally be subjected to a heat treatment. Preferably, the wetted grains are dried and are subjected to a heat treatment. In one embodiment, these operations are carried out in just one processing stage.

The heat treatment is adapted so as to adjust the surface porosity of the coating to the targeted application. In particular, the coated grains can be subjected to a firing at a temperature of between 1200° C. and 1700° C., for a period of time of 5 hours.

The surface porosity, which can be measured as described below, can be in particular less than 25%, preferably less than 20%, preferably less than 15%, preferably less than 10%, preferably less than 5%, preferably less than 3%, indeed even less than 2%. The inventors consider that a surface porosity of less than 3% can only be obtained by subjecting the coated grain to a heat treatment. The surface porosity of a grain which has not been subjected to the heat treatment is typically greater than 20%.

The use of a heat treatment advantageously makes it possible to obtain a coating which exhibits neither cracks nor flakes. It also results in the adhesion of the coating being considerably improved.

The inventors have demonstrated, by microprobe, with regard to the coated grains which have been subjected to a heat treatment, the presence, in the coating, at the interface with the base grain, of a transition layer enriched in silica, this silica originating from the base grain. For example, in a grain of electrocast mullite covered with an alumina coating, a heat treatment at 1420° C. resulted in a thin transition layer between the mullite of the base grain and the alumina of the coating, said transition layer comprising alumina silicate.

The heat treatment can also result from a sintering of a preform in order to manufacture a refractory product according to the invention, as explained below. Such a sintering also results in the appearance of a transition layer.

In one embodiment, the coated grains according to the invention, for example manufactured according to stages a) to d) above, are intended for the manufacture of a sintered refractory product. It can then be used to prepare a "ready-for-use" powder according to the invention.

To this end, coated grains according to the invention exhibiting a size of greater than or equal to 50 µm are preferably selected, in order for them to be able to form at least a portion of the coarse fraction. Coarse particles, in particular made of a ceramic material chosen from alumina, zirconia, magnesia, silica and their mixtures, can supplement the coated grains according to the invention to form the coarse fraction.

Matrix particles are also selected. The latter are intended, after sintering, to form the matrix of the refractory material.

Finally, preferably, a shaping additive is added, so that the amount of shaping additive represents less than 6% of the weight obtained. The shaping additive is preferably chosen from the group consisting of:
- clays;
- plasticizers, such as polyethylene glycol (PEG) or polyvinyl alcohol (PVA);
- cements, preferably comprising more than 70% of alumina;
- hydratable aluminas, such as boehmite;
- binders, including temporary organic binders, such as resins, lignosulfonates, carboxymethylcellulose or dextrin;
- deflocculating agents, such as alkali metal polyphosphates, alkali metal polyacrylates, or polycarboxylates; and
- the mixtures of these products.

Preferably, the shaping additive is chosen from the group consisting of cements, deflocculating agents, clays, lignosulfonates, PVA and their mixtures.

The powder can then be packaged, for example in bags, in particular of big bag type, or in kegs. The preparation of the starting charge for manufacturing the preform is thereby facilitated.

Starting from this powder, a refractory product according to the invention can be manufactured according to a process comprising the above stages A) to C).

In stage A), a starting charge is prepared by addition of water to the powder.

The amount of water is adjusted in stage B). For example, in the case of shaping by cold pressing, addition of an amount of water of between 1.5% and 4%, as percentage by weight based on the powder, without taking into account the shaping additives, is preferred. In the case of shaping which involves a hydraulic bond, addition of an amount of water of between 3 and 9%, as percentage by weight based on the powder, without taking into account the shaping additives, is preferred.

The starting charge is mixed in order to obtain a homogeneous mass capable of being shaped in stage B), for example by pouring into a mold or projecting onto a wall.

In stage B), any known method can be envisaged.

In stage C), the sintering conditions and in particular the sintering temperature depend on the composition of the powder. Generally, a sintering temperature of greater than 1400° C., indeed even of greater than 1450° C., and/or of less than 1900° C., indeed even of less than 1750° C., is highly suitable.

In the refractory product obtained, the coating remains visible over a cross section of the refractory product, even when the matrix is the same in nature as the coating. This is because it is possible to differentiate, by observations by scanning electron microscopy (SEM) or using a microprobe, the coating of the matrix, in particular by the fact that the coating exhibits a lower porosity than the porosity of the matrix, which generates a gangue around the base grain visible, inter alia, using these methods.

Figure 1:
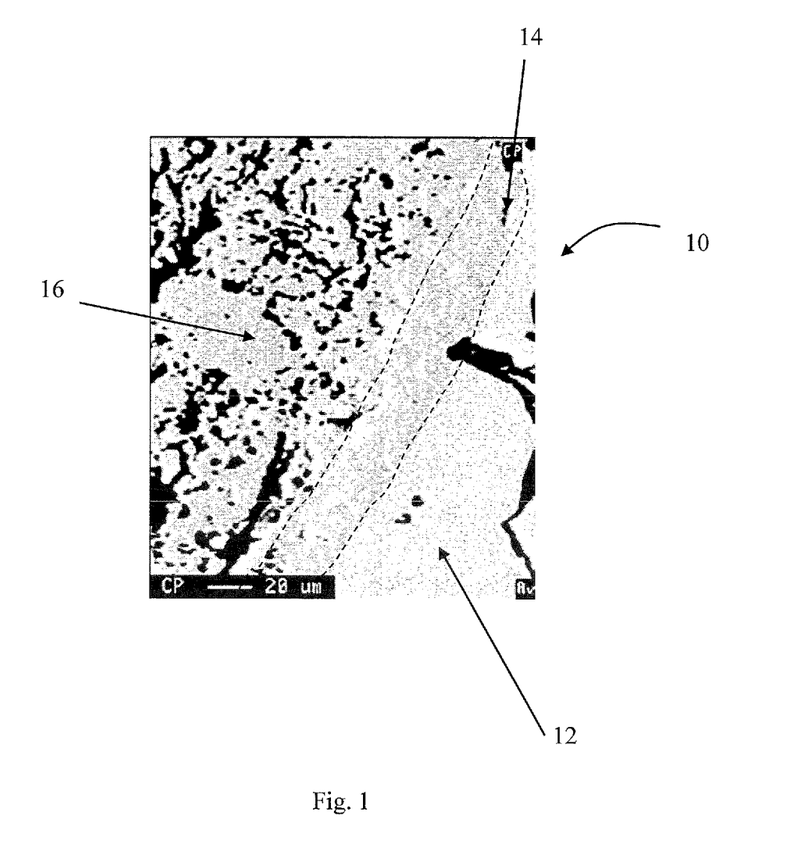
FIG. 1 is a photograph obtained using a scanning electron microscope (SEM). It represents, in cross section, a portion of a coated grain according to the invention, in the case in point a cross section of a grain of example G2 described below.

In particular, FIG. 1 represents a coated grain 10 comprising a base grain 12 of mullite and a coating 14 of alumina spread out on the surface of the base grain 12. The matrix is referenced 16.

EXAMPLES

Coated grains G2 and G3 according to the invention were manufactured according to a process comprising stages a) to d) described above. The grains G1 were not coated.

More particularly, a slip was prepared by suspending an alumina powder, with a purity of greater than 99% and with a median size of 10 µm, in a solution of polyvinyl alcohol (PVA).

Grains of electrocast mullite exhibiting sizes of between 50 µm and 2 mm were poured into and mixed in the slip, and then extracted from said slip. The mullite grains, wetted with slip, were subsequently dried at 110° C. for 24 hours and then heat treated at a temperature T for six hours.

Analyses by microprobe made it possible to observe, in the coated grains G2 and G3, the presence of a transition layer between the base grain made of mullite and the alumina forming the upper layer of the coating. This transition layer comprises silica in the form of an alumina silicate.

Observation of the coated grains G2 and G3 showed that, after sintering, the entire surface of the base grains is covered with an alumina-based coating.

The coated grains G1, G2 and G3 were subsequently used to produce powders P1, P2 and P3 respectively. Corn dextrin and water-soluble oil were used as shaping additives.

The powders P1, P2 and P3 were subsequently used to manufacture sintered refractory products R1, R2 and R3 respectively. To this end, they were mixed with 2.6% of water, as percentages by weight based on the powder, so as to foal' a starting charge. The starting charge was pressed in the form of bars with dimensions of 112×23×20 mm$^3$ with a single-acting mechanical press, under a pressure of 470 kg/cm$^2$. These bars were subsequently sintered at a temperature of 1650° C., maintained for six hours, the rate of temperature rise being 100° C./h. After the temperature stationary phase, the temperature was reduced, the rate of temperature fall being 100° C./h, down to 800° C., the fall in temperature subsequently being free down to ambient temperature.

The surface porosity of a coating of a coated grain is the percentage of the surface of a cross section of this coating occupied by the pores. For the examples, it was evaluated in the following way:

Preparation of the Sample

At least 200 grains are randomly withdrawn. They are subsequently coated in an epoxy resin and polished using sandpaper of decreasing particle size P80 to P1200. The final polishing is carried out on felt with an aqueous diamond suspension with a median particle size of 3 µm.

Taking of Photographs

Photographs are subsequently taken using a scanning electron microscope (SEM), preferably in a mode using backscattered electrons (BSE mode) in order to obtain a very good contrast between the different phases. Each photograph exhibits a minimum of 1280×960 pixels, without taking into account the scale bar. The magnification used is such that the width of the image is between 20 times and 400 times the mean size of the pores. A first photograph can be taken by virtue of a visual estimation of the mean size of the pores.

Prior to analyzing the surface porosity, it is necessary to make sure that the porosities are discernible to the naked eye on the photograph and that the porosities as well as the continuous background appear darker than the material observed.

Image Analysis of the Surface Porosity

The image is analyzed using the JMicrovision v1.2.7 2002-2008 software, available on http://www.jmicrovision.com.

Open the image in Jmicrovision
Select the heading "object extraction"
Select "Color or gray intensity threshold"
In the open window, choose the heading "Area" and mark, by virtue of "Area editor" and the polygonal tool, the coating region to be analyzed on the grain. Rename this region "coating" and select it as analytical region.
Select the heading "Fill object" and select this option
In the heading "Threshold", in the tab "Red", move the indexes until the pores are completely filled with red color.
In the heading "Assign class", add a class named "Porosity" and select it.
Press "Process": the pores are then surrounded in red.
Go into the "Data Viewer" window and select the "Classes" mode and press "Compute result from Area"
The surface porosity is indicated in the "Coating (image surface %)" column
200 pores have to be analyzed and the same measurement is repeated on ten different photographs. The mean of these analyses gives the surface porosity of the coating.

The thickness of the coating of a grain is the mean thickness of this coating. For the examples, it was evaluated in the following way:

The preparation of the sample is the same as for the analysis of surface porosity.

Taking of Photographs

Photographs are taken using an optical microscope. Each photograph exhibits a minimum of 2080*1544 pixels, without taking into account the scale bar. The magnification used is such that the width of the image is between 20 times and 100 times the mean thickness of the coating. A first photograph can be taken by virtue of a visual estimation of the thickness of the coating.

Prior to analyzing the thickness of the coating, it is necessary to make sure that the coating is discernible to the naked eye on the photograph.

Image Analysis of the Coating Thickness

The image is analyzed using the JMicrovision v1.2.7 2002-2008 software, available on http://www.jmicrovision.com.

Open the image in Jmicrovision
Select the tool "straight" in the tool bar and carry out a measurement of thickness at 10 points of the coating on the periphery of each grain equidistant from one another. This operation is repeated on 10 grains taken randomly from the grains initially withdrawn.
Go into the "Data Viewer" window and select in Data "1D measurement". A mean then has to be taken with regard to the sample of data of the "Line length" column.

The measurements of the bulk density and of the open porosity of the refractory products were carried out by hydrostatic measurements according to standard NF EN 993-1 on samples with dimensions of 125×25×25 $mm^3$.

The modulus of rupture (MOR) of the refractory products was measured according to the standard NF EN 993-6.

A water vapor corrosion test was carried out on the refractory products according to the following method:

This test is carried out in a tubular furnace, the tube of which is made of pure AL99 alumina. The samples are 114*23*20 $mm^3$ bars positioned on two superimposed pure alumina sheets. The furnace is brought to 1400° C. and then maintained at this temperature for 320 hours. Injection of an aqueous sodium hydroxide solution comprising 0.15 g/l of Na is carried out at the inlet of the furnace and discharge of the water vapor is provided by condensation with a cooler in the rear part of the furnace.

The following parameters are evaluated before and after passing through the furnace:

the modulus of rupture (MOR) of the sample,
the variation in modulus of rupture ($\Delta$MOR %).

The variation in modulus of rupture $\Delta$MOR % is defined as being:

$$100 \cdot (MOR\ before\ test - MOR\ after\ test)/(MOR\ before\ test).$$

The inventors consider that a decrease of 5% in the variation of modulus of rupture $\Delta$MOR % with respect to the refractory product R1 represents a significant improvement.

The characteristics of the coated grains, of the powders and of the refractory products, and also the results obtained, are summarized in the following table 1:

TABLE 1

|  | G1 (*) | G2 | G3 |
| --- | --- | --- | --- |
| Coated grains | | | |
| Nature of the base grain | electrocast mullite | electrocast mullite | electrocast mullite |
| Nature of the coating material | no coating | alumina | alumina |
| Temperature T of the heat treatment (° C.) | — | 1420° C. | 1630° C. |
| Properties | | | |
| Mean thickness of the coating (μm) | — | 50 | 50 |
| Surface porosity of the coating (%) | — | 19 | 9 |
| Powders | | | |
|  | P1 (*) | P2 | P3 |
| Amount of coated grains with a size greater than or equal to 50 μm (%) | 34.5 | 45 | 45 |
| Amount of the other coarse particles (%) | 34.5 | 25 | 22 |
| Nature of the other coarse particles | alumina | alumina | alumina |
| Amount of matrix particles (%) | 29.5 | 30 | 30 |
| Nature of the matrix particles | alumina | alumina | alumina |
| Corn dextrin | 1 | 1 | 1 |
| Water-soluble oil | 0.5 | 0.5 | 0.5 |

TABLE 1-continued

| | Refractory products | | |
|---|---|---|---|
| | R1 (*) | R2 | R3 |
| Composition by weight of the refactory product | | | |
| % $Al_2O_3$ | 90.7 | 90.7 | 90.7 |
| % $SiO_2$ | 9.1 | 9.1 | 9.1 |
| % Others | 0.2 | 0.2 | 0.2 |
| Properties | | | |
| Bulk density (g/cm$^3$) | 2.88 | 2.94 | 2.93 |
| Open porosity (%) | 19.5 | 16.9 | 17.5 |
| MOR at 20° C. before corrosion test (MPa) | 9.6 | 11.6 | 12.7 |
| MOR at 20° C. after corrosion test (MPa) | 7.9 | 10.1 | 11.9 |
| ΔMOR % | −18% | −12% | −7% |

(*) Comparative example

As is shown in table 1, the refractory products R2 and R3 according to the invention exhibit a smaller variation in modulus of rupture ΔMOR % than that of the refractory product R1 which does not comprise alumina-coated mullite grains. The improvement is respectively 33% (100·(18−12)/18) and 61% (100·(18−7)/18).

These refractory products additionally exhibit a greater modulus of rupture MOR than that of the refractory product R1, before and after the corrosion test. The mechanical strength during use is advantageously improved thereby.

Finally, a comparison between the refractory products R2 and R3 shows the advantage of a high-temperature heat treatment, in particular at a temperature greater than 1500° C.

Furthermore, a water vapor corrosion test was carried out under the same conditions as those described above, on the refractory product R1, after having deposited, at its external surface, an alumina coating with a thickness equal to 400 μm identical to that used to coat the mullite grains G3.

Figure 2:
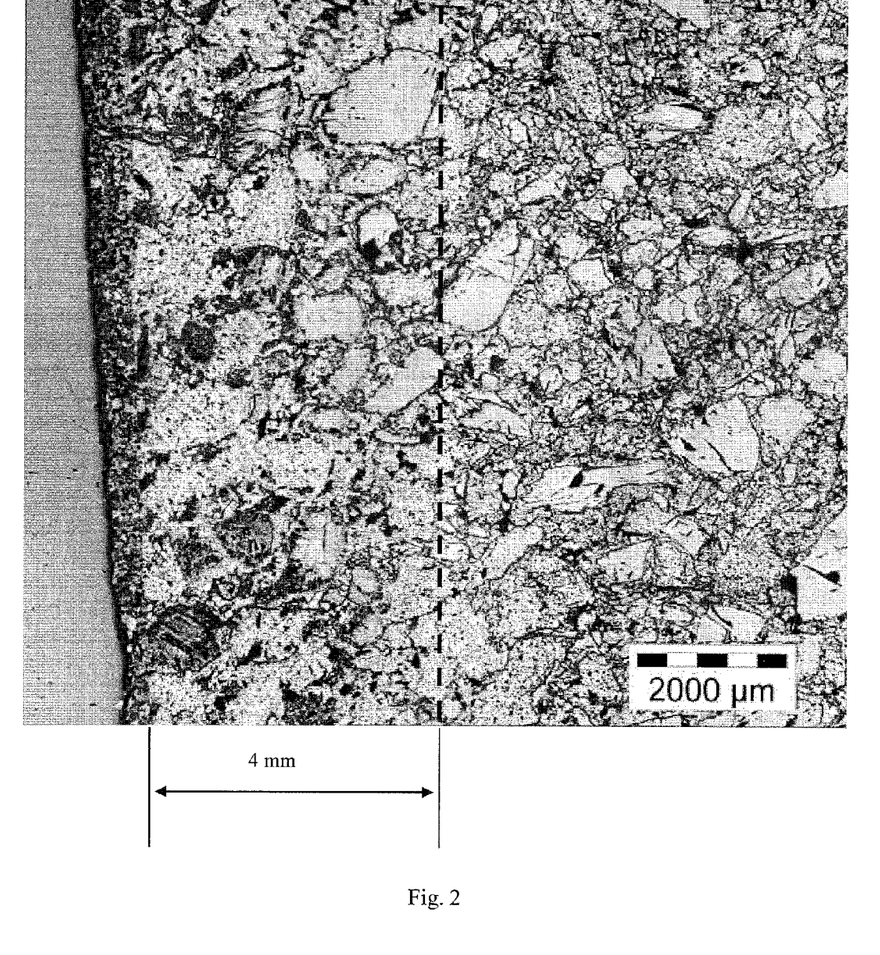
FIGS. 2 and 3 represent, after having carried out the water vapor corrosion test, a polished cross section of the refractory products R1 and R3, respectively, an alumina coating having been deposited, prior to the test, on the external surface of the product R1, outside the invention.
Figure 3:
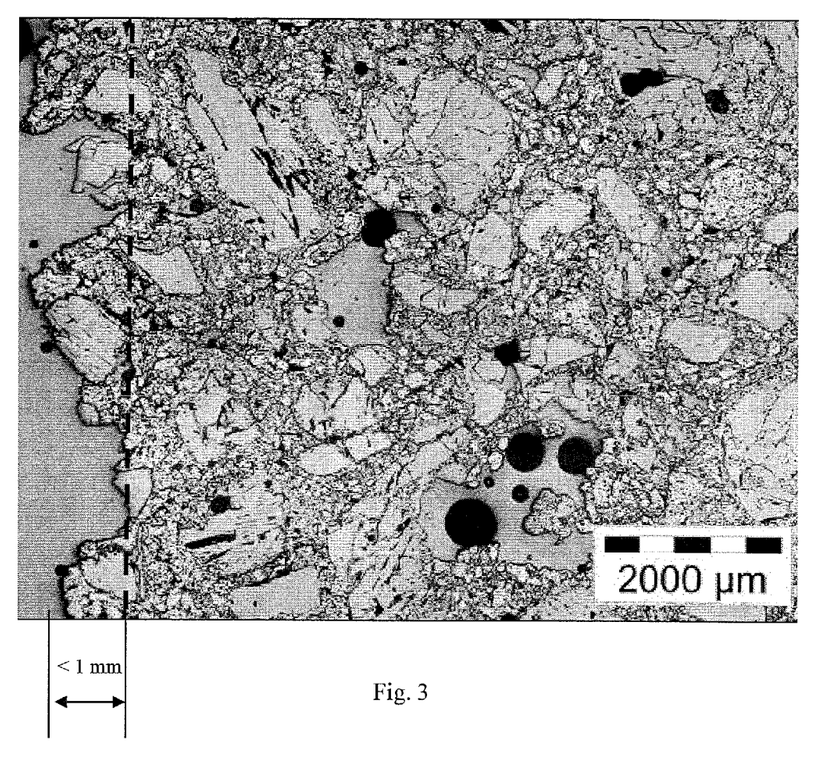

Photographs were taken with an optical microscope on polished sections of this coated product R1 and on the refractory product R3 (FIGS. 2 and 3, respectively). A comparison of these photographs makes it possible to demonstrate a better resistance of the refractory product R3 according to the invention. This is because the depth down to which the mullite grains were attacked by the water vapor is 4.5 mm for the refractory product R1 coated with an alumina layer and less than 1 mm for the product R3.

These measures thus show a better behavior in the water vapor corrosion test of a refractory product according to the invention comprising mullite grains, said grains exhibiting an alumina coating, with respect to a refractory product comprising mullite grains, said refractory product exhibiting an alumina coating deposited on its external surface.

As is now clearly apparent, the invention thus provides novel materials suited to the highly specific environment of combustion chambers.

Of course, the invention is not limited to the embodiments provided by way of examples.

In particular, it is possible to manufacture grains according to the invention using a technique of hot projection of particles which advantageously makes it possible to form the coating and to sinter it in a single stage.

The invention claimed is:

1. A powder comprising:
    a coarse fraction representing more than 60% and less than 85% of the powder, as percentage by weight based on the oxides, and consisting of particles exhibiting a size of greater than or equal to 50 μm, referred to as "coarse particles", the powder comprising at least 5% of coated grains exhibiting a size of greater than or equal to 50 μm, as percentage by weight based on the oxides of the powder, and
    a fine fraction, forming the remainder to 100% as percentage by weight based on the oxides, consisting of particles exhibiting a size of less than 50 μm, referred to as "matrix particles",
    said coated grains each comprising:
        a base grain comprising more than 30% by weight of mullite;
        a coating extending over more than 50% of the surface of said base grain and consisting, for more than 90% of its weight, of a coating material chosen from:
        alumina;
        $CaSiO_3$;
        lanthanide, Ta, Ti, Sc, Y, Mg, Mo aluminates and their mixtures;
        lanthanide, Sc, Y, Zr, Hf silicates and their mixtures;
        oxides of one or more elements chosen from Ti, Sc, Y, Yb, Mg, Ce, Mo, Zr and Hf;
        lanthanide and/or Y and/or Sc phosphates;
        and their mixtures,
    the powder comprising more than 20% of particles exhibiting a size greater than 150 μm, as percentage by weight based on the oxides of the powder,
    the powder exhibiting a content of alumina of greater than 70%, as percentage by weight based on the oxides.

2. The powder as claimed in claim 1, in which said coating extends over more than 70% of the surface of said base grain.

3. The powder as claimed in claim 2, in which said coating extends over more than 90% of the surface of said base grain.

4. The powder as claimed in claim 1, in which the surface porosity of the coating is less than 25%.

5. The powder as claimed in claim 4, in which the surface porosity of the coating is less than 3%.

6. The powder as claimed in claim 1, in which the base grain comprises more than 50% of mullite, as a percentage by weight based on the oxides.

7. The powder as claimed in claim 6, in which the base grain comprises more than 80% of mullite, as a percentage by weight based on the oxides.

8. The powder as claimed in claim 1, in which the coating is composed of:
    an external layer made of said coating material, and
    a transition layer which extends between the base grain and said external layer and which comprises:
    silica and/or alumina,
    and at least one of the constituents of the coating material.

9. The powder as claimed in claim 1, in which the coating material is chosen from:
    $Al_2O_3$;
    $GdAlO_3$, $Gd_4Al_2O_9$, $Gd_3Al_5O_{12}$, $AlTaO_4$, $Al_2TiO_5$, $Y_3Al_5O_{12}$, $YAlO_3$, $Y_4Al_2O_9$, $Yb_4Al_2O_9$, $YbAlO_3$, $Yb_3Al_5O_{12}$, $MgAl_2O_4$ and their mixtures;
    $Gd_2SiO_5$, $Gd_2Si_2O_7$, $Sc_2Si_2O_7$, $Sc_2SiO_5$, $Y_2Si_2O_7$, $Y_2SiO_5$, $Yb_2Si_2O_7$, $Yb_2SiO_5$, $ZrSiO_4$, $HfSiO_4$, (Zr,Hf)$SiO_4$, $CaSiO_3$;
    $ZrO_2$, $HfO_2$, $HfTiO_4$, $ScTaO_4$, $Sc_4Hf_3O_{12}$, $Sc_4Zr_3O_{12}$, a partially stabilized and/or stabilized zirconia, a partially stabilized and/or stabilized hafnone, and their mixtures;
    $LaPO_4$, $YPO_4$ and their mixtures;
    and their mixtures.

10. The powder as claimed in claim 9, in which the coating material is alumina.

11. The powder as claimed in claim 1, containing more than 40% of said coated grains with a size of greater than or equal to 50 μm, as a percentage by weight based on the oxides of the powder.

12. The powder as claimed in claim 11, in which the coarse fraction comprises, for more than 95% of its weight, particles composed, for more than 95% of their weight, of alumina and/or zirconia and/or magnesia and/or silica, and said coated grains, and in which the fine fraction consists of particles composed of alumina and/or zirconia and/or magnesia and/or silica.

13. The powder as claimed in claim 1, in which the fine fraction comprises less than 90% of silica, as percentage by weight based on the oxides of the fine fraction.

14. The powder as claimed in claim 1, exhibiting a content of alumina $Al_2O_3$ of greater than 60% and a content of silica $SiO_2$ of less than 30%, as percentage by weight based on the oxides.

15. The powder as claimed in claim 1, exhibiting a content of alumina $Al_2O_3$ of greater than 85% and a content of silica $SiO_2$ of less than 10%, as percentage by weight based on the oxides.

16. The powder as claimed in claim 1, in which the thickness of the coating is less than 300 μm.

17. The powder of claim 1 exhibiting a content of greater than 80%, as percentage by weight based on the oxides.

18. The powder of claim 1, wherein the coarse fraction comprises particles composed, for more than 95% of their weight, of alumina and/or magnesia and/or silica.

19. The power of claim 1, wherein the coarse fraction comprises, for more than 95% of its weight:
   particles composed, for more than 95% of their weight, of alumina and/or magnesia and/or silica, or mixtures of such particles, and
   coated grains having base grains made of mullite / zirconia and/or mullite.

20. The powder of claim 1, wherein the fine fraction comprises particles composed of alumina and/or magnesia and/or silica.

21. The powder of claim 20, wherein the fine fraction consists of particles composed of alumina and/or magnesia and/or silica.

22. The powder of claim 1, wherein the coarse fraction comprises alumina coarse particles.

23. A device chosen from a combustion chamber of a gas turbine and a reformer, said device comprising a sintered refractory product manufactured from a powder as claimed in claim 1, in particular in the form of a protective part.

24. A sintered product manufactured according to a process comprising the following successive stages:
   A) preparation of a starting charge by addition of water to a powder comprising:
      a coarse fraction representing more than 60% and less than 85% of the powder, as percentage by weight based on the oxides, and consisting of particles exhibiting a size of greater than or equal to 50 μm, referred to as "coarse particles", the powder comprising at least 5% of coated grains exhibiting a size of greater than or equal to 50 μm, as percentage by weight based on the oxides of the powder, and
      a fine fraction, forming the remainder to 100% as percentage by weight based on the oxides, consisting of particles exhibiting a size of less than 50 μm, referred to as "matrix particles",
   said coated grains each comprising:
      a base grain comprising more than 30% by weight of mullite;
      a coating extending over more than 50% of the surface of said base grain and consisting, for more than 90% of its weight, of a coating material chosen from:
      alumina;
      $CaSiO_3$;
      lanthanide, Ta, Ti, Sc, Y, Mg, Mo aluminates and their mixtures;
      lanthanide, Sc, Y, Zr, Hf silicates and their mixtures;
      oxides of one or more elements chosen from Ti, Sc, Y, Yb, Mg, Ce, Mo, Zr and Hf;
      lanthanide and/or Y and/or Sc phosphates;
      and their mixtures,
   B) shaping said starting charge so as to form a preform;
   C) sintering said preform,
   the product exhibiting the appearance of a block or of a layer, said block or layer having a thickness greater than 3 mm.

25. A method comprising:
   subjecting a sintered refractory product manufactured from a powder as claimed in claim 1 to gases laden with water vapor exhibiting a temperature of greater than 1000° C.

* * * * *